US012037426B2

(12) United States Patent
Park et al.

(10) Patent No.: US 12,037,426 B2
(45) Date of Patent: Jul. 16, 2024

(54) OLEFIN-BASED COPOLYMER AND METHOD FOR PREPARING THE SAME

(71) Applicant: LG Chem, Ltd., Seoul (KR)

(72) Inventors: In Sung Park, Daejeon (KR); Sang Eun Park, Daejeon (KR); Eun Jung Lee, Daejeon (KR); Hyun Jin Ju, Daejeon (KR); Tae Su Kim, Daejeon (KR); Choong Hoon Lee, Daejeon (KR); Jin Sam Gong, Daejeon (KR); Jung Ho Jun, Daejeon (KR); Rae Keun Gwak, Daejeon (KR)

(73) Assignee: LG Chem, Ltd., Seoul (KR)

( * ) Notice: Subject to any disclaimer, the term of this patent is extended or adjusted under 35 U.S.C. 154(b) by 562 days.

(21) Appl. No.: 17/312,230

(22) PCT Filed: Nov. 15, 2019

(86) PCT No.: PCT/KR2019/015695
§ 371 (c)(1),
(2) Date: Jun. 9, 2021

(87) PCT Pub. No.: WO2021/040139
PCT Pub. Date: Mar. 4, 2021

(65) Prior Publication Data
US 2022/0049033 A1 Feb. 17, 2022

(30) Foreign Application Priority Data

Aug. 28, 2019 (KR) .................. 10-2019-0105771

(51) Int. Cl.
C08F 210/16 (2006.01)
C07F 17/00 (2006.01)
C08F 4/6592 (2006.01)

(52) U.S. Cl.
CPC ............ *C08F 210/16* (2013.01); *C07F 17/00* (2013.01); *C08F 4/6592* (2013.01)

(58) Field of Classification Search
CPC ....... C08F 4/6592; C08F 210/16; C07F 17/00
See application file for complete search history.

(56) References Cited

U.S. PATENT DOCUMENTS

| | | | |
|---|---|---|---|
| 4,935,474 A | 6/1990 | Ewen et al. | |
| 6,828,394 B2 | 12/2004 | Vaughan et al. | |
| 6,841,631 B2 | 1/2005 | Loveday et al. | |
| 6,894,128 B2 | 5/2005 | Loveday et al. | |
| 2001/0044508 A1 | 11/2001 | Loveday et al. | |
| 2002/0052453 A1 | 5/2002 | Loveday et al. | |
| 2003/0088038 A1 | 5/2003 | Vaughan et al. | |
| 2004/0030066 A1 | 2/2004 | Loveday et al. | |
| 2004/0030070 A1 | 2/2004 | Loveday et al. | |
| 2004/0034179 A1 | 2/2004 | Loveday et al. | |
| 2004/0225088 A1 | 11/2004 | Vaughan et al. | |
| 2017/0081509 A1 | 3/2017 | Takura et al. | |
| 2017/0145122 A1 | 5/2017 | Kim et al. | |
| 2017/0298538 A1 | 10/2017 | Bae et al. | |
| 2018/0194874 A1 | 7/2018 | Kim et al. | |
| 2018/0371116 A1 | 12/2018 | Kim et al. | |
| 2019/0322773 A1 | 10/2019 | Lee et al. | |
| 2020/0362073 A1 | 11/2020 | Park et al. | |
| 2021/0009793 A1 | 1/2021 | Lee et al. | |
| 2021/0032449 A1 | 2/2021 | Park et al. | |
| 2021/0095062 A1 | 4/2021 | Park et al. | |

FOREIGN PATENT DOCUMENTS

| | | |
|---|---|---|
| EP | 3705504 A1 | 9/2020 |
| EP | 3770188 A1 | 1/2021 |
| EP | 3936566 A1 | 1/2022 |
| JP | 4056368 B2 | 3/2008 |
| JP | 2017088893 A | 5/2017 |
| JP | 2018501186 A | 1/2018 |
| JP | 2021505711 A | 2/2021 |
| JP | 2021518879 A | 8/2021 |
| KR | 20160070713 A | 6/2016 |
| KR | 20180054060 A | 5/2018 |
| KR | 20180055221 A | 5/2018 |
| KR | 20180074576 A | 7/2018 |
| KR | 101920401 B1 | 2/2019 |
| KR | 20190074963 A | 6/2019 |
| KR | 20190076899 A | 7/2019 |
| KR | 20190078529 A | 7/2019 |
| KR | 20190127592 A | 11/2019 |
| KR | 20190127594 A | 11/2019 |
| WO | 2019125050 A1 | 6/2019 |
| WO | 2019132475 A1 | 7/2019 |

OTHER PUBLICATIONS

Extended European Search Report and European Search Opinino for European Patent Application No. 19942785.7 dated Mar. 17, 2022, 6 pgs.
International Search Report for Application No. PCT/KR2019/015695 mailed May 26, 2020, pp. 1-2.

*Primary Examiner* — Caixia Lu
(74) *Attorney, Agent, or Firm* — Lerner David LLP

(57) ABSTRACT

The present invention relates to an olefin-based copolymer of which soluble fraction at a low temperature has a high weight average molecular weight, and which has high flowability and improved physical properties of hardness, flexural strength, tearing strength, etc., and a method for preparing the same.

10 Claims, No Drawings

OLEFIN-BASED COPOLYMER AND METHOD FOR PREPARING THE SAME

CROSS-REFERENCE TO RELATED APPLICATIONS

This application is a national phase entry under 35 U.S.C. § 371 of International Application No. PCT/KR2019/015695 filed Nov. 15, 2019, which claims priority from Korean Patent Application No. 10-2019-0105771 filed Aug. 28, 2019, all of which are incorporated herein by reference.

TECHNICAL FIELD

The present invention relates to an olefin-based copolymer of which soluble fraction at a low temperature has a high weight average molecular weight, and which has high flowability and improved physical properties such as hardness, flexural strength and tearing strength, and a method for preparing the same.

BACKGROUND ART

Olefin polymerization catalyst systems may be classified into Ziegler-Natta and metallocene catalyst systems, and these two highly active catalyst systems have been developed in accordance with the characteristics of each. The Ziegler-Natta catalyst has been widely applied in a commercial process since its invention in the 1950s, but is a multi-site catalyst in which many active sites are coexist and has the characteristics of broad molecular weight distribution of a polymer; in addition, since the composition distribution of a comonomer is nonuniform, there are limitations in securing desired physical properties.

A metallocene catalyst is composed of the combination of a main catalyst having a transition metal compound as a main component and a promoter which is an organometal compound having aluminum as a main component, and such a catalyst is a homogeneous complex catalyst and is a single site catalyst. According to the single site properties, a polymer having narrow molecular weight distribution and uniform composition distribution of a comonomer is obtained, and according to the structural deformation of the ligand of a catalyst and polymerization conditions, the steric regularity, copolymerization properties, a molecular weight, crystallinity, etc. of a polymer may be changed.

Meanwhile, a linear low-density polyethylene is prepared by copolymerizing ethylene and alpha olefin using a polymerization catalyst at a low pressure, and is a resin having narrow molecular weight distribution and a short chain branch with a certain length without a long chain branch. A linear low-density polyethylene film has the properties of a common polyethylene, high breaking strength and elongation rate, and excellent tearing strength and falling weight impact strength, and thus, is increasingly used in a stretch film, an overlap film, etc., to which the conventional low-density polyethylene or high-density polyethylene is difficult to apply.

However, most linear low-density polyethylene using 1-butene or 1-hexene as a comonomer is prepared in a single gas phase reactor or a single loop slurry reactor, and has higher productivity when compared with a process using a 1-octene comonomer. However, the properties of such a product also are greatly inferior to a case using a 1-octene comonomer due to the limitations of catalyst technology used and process technology used, and the molecular weight distribution thereof is narrow, and thus, processability is poor.

U.S. Pat. No. 4,935,474 reports a method of preparing polyethylene having broad molecular weight distribution by using two or more metallocene compounds. U.S. Pat. No. 6,828,394 reports a method of preparing polyethylene having excellent processability and which is particularly suitable as a film, by mixing a comonomer having good bonding properties and a comonomer without them. In addition, U.S. Pat. Nos. 6,841,631 and 6,894,128 indicate that polyethylene having bimodal or multimodal molecular weight distribution is prepared by using a metallocene catalyst using at least two kinds of metal compounds, and is applicable to the use of a film, a blow molding, a pipe, etc. However, such products have improved processability but a nonuniform dispersion state by the molecular weight in a unit particle, and extrusion appearance is rough and physical properties are unstable even under relatively good extrusion conditions.

In such a background, the preparation of an excellent product making balance between physical properties and processability is continuously required, and particularly, a polyethylene copolymer having excellent processability is increasingly required.

PRIOR ART DOCUMENTS

Patent Documents (Patent Document 1) U.S. Pat. No. 4,935,474
(Patent Document 2) U.S. Pat. No. 6,828,394
(Patent Document 3) U.S. Pat. No. 6,841,631
(Patent Document 4) U.S. Pat. No. 6,894,128

DISCLOSURE OF THE INVENTION

Technical Problem

The task to solve in the present invention is to provide an olefin-based copolymer of which soluble fraction at a low temperature has a high weight average molecular weight, and which has high flowability and improved physical properties such as hardness, flexural strength and tearing strength.

Another task to solve in the present invention is to provide a method for preparing the olefin-based copolymer.

Technical Solution

The present invention provides an olefin-based copolymer in which (a) a melt index (MI, 190° C., 2.16 kg load conditions) is 10 to 100 g/10 min, (b) a soluble fraction (SF) at −20° C. measured by cross-fractionation chromatography (CFC) is 0.5 to 10 wt %, where a weight average molecular weight of the soluble fraction (Mw(SF)) is 22,000 or more, and (c) a value of Mw:Mw(SF), which is a ratio of a weight average molecular weight of the olefin-based copolymer (Mw) and the weight average molecular weight of the soluble fraction (Mw(SF)), is 0.9:1 to 2:1.

In addition, the present invention provides a method for preparing the olefin-based copolymer, including a step of polymerizing an olefin-based monomer by injecting hydrogen in 10 to 100 cc/min in the presence of a catalyst composition including a transition metal compound represented by the following Formula 1:

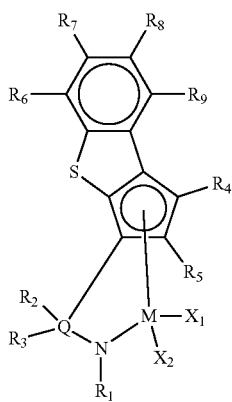

[Formula 1]

In Formula 1,

R₁ is hydrogen; alkyl of 1 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, R₂ and R₃ are each independently hydrogen; halogen; alkyl of 1 to 20 carbon atoms; alkenyl of 2 to 20 carbon atoms; arylalkyl of 7 to 20 carbon atoms; alkylamido of 1 to 20 carbon atoms; or arylamido of 6 to 20 carbon atoms, R₄ to R₉ are each independently hydrogen; silyl; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms, adjacent two or more among the R₂ to R₉ may be connected with each other to form a ring, Q is Si, C, N, P or S, M is a transition metal in group 4, and X₁ and X₂ are each independently hydrogen; halogen; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

Advantageous Effects

The olefin-based copolymer according to the present invention shows a high weight average molecular weight of a soluble fraction at a low temperature, has improved hardness and is highly flowable, and has advantages of manufacturing an excellent composite material having improved impact resistance at a low temperature and room temperature in contrast to a copolymer having similar degrees of density and hardness.

BEST MODE FOR CARRYING OUT THE INVENTION

Hereinafter, the present invention will be described in more detail to assist the understanding of the present invention.

It will be understood that words or terms used in the present disclosure and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The term "polymer" used in the present invention means a polymer compound prepared by polymerizing monomers which are the same or different types. The common term, "polymer" includes a term, "interpolymer" as well as "homopolymer", "copolymer" and "terpolymer". The term "interpolymer" means a polymer prepared by polymerizing two or more different types of monomers. The common term "interpolymer" includes a term "copolymer" (commonly used to refer a polymer prepared from two different monomers) and a term "terpolymer" (commonly used to refer a polymer prepared from three different monomers). The term "interpolymer" includes a polymer prepared by polymerizing four or more types of monomers.

Hereinafter, the present invention will be explained in detail.

Olefin-Based Copolymer

The olefin-based copolymer according to the present invention is characterized in satisfying the following conditions (a) to (c):

(a) a melt index (MI, 190° C., 2.16 kg load conditions) is 10 to 100 g/10 min, (b) a soluble fraction (SF) at −20° C. measured by cross-fractionation chromatography (CFC) is 0.5 to 10 wt %, where a weight average molecular weight of the soluble fraction (Mw(SF)) is 22,000 or more, and (c) a value of Mw:Mw(SF), which is a ratio of a weight average molecular weight of the olefin-based copolymer (Mw) and the weight average molecular weight of the soluble fraction (Mw(SF), is 0.9:1 to 2:1.

According to conditions (a), the melt index (MI, 190° C., 2.16 kg load conditions) of the olefin-based copolymer according to the present invention is 10 to 100 g/10 min.

The melt index (MI) may be controlled by controlling the amount of a catalyst used in a process of polymerizing an olefin-based copolymer with respect to a comonomer, and influences the mechanical properties, impact strength, and moldability of the olefin-based copolymer. The melt index is measured in low-density conditions, and measured under 190° C. and 2.16 kg load conditions according to ASTM D1238, and may be 5 to 200 g/10 min, particularly, 10 to 150 g/10 min, more particularly, 10 to 100 g/10 min. Particularly, the melt index may be 10 g/10 min or more, or 11 g/10 min or more, 11.5 g/10 min or more, or 12 g/10 min or more, and 100 g/10 min or less, 50 g/10 min or less, or 40 g/10 min or less, 36 g/10 min or less.

According to conditions (b), the olefin-based copolymer according to the present invention has the soluble fraction (SF) at −20° C. measured by cross-fractionation chromatography (CFC) of 0.5 to 10 wt %, where a weight average molecular weight of the soluble fraction (Mw(SF)) is 22,000 or more.

The cross-fractionation chromatography (CFC) is a combined method of temperature rising elution fractionation (TREF) and gel filtration chromatography (GPC), and the crystallinity distribution and molecular weight distribution of the olefin-based copolymer may be found simultaneously.

Particularly, a specimen solution with a high temperature in which an olefin-based copolymer is completely dissolved in a solvent, is injected into a column filled with an inert carrier, and the temperature of the column is decreased so as to attach the specimen to the surface of a filler. Then, the temperature of the column is slowly increased while flowing o-dichlorobenzene in the column. The concentration of the olefin-based copolymer eluted at each temperature is detected, and at the same time, the component eluted at each temperature is sent fraction by fraction via on-line to GPC to obtain chromatogram, and from the chromatogram, the molecular weight distribution of each component is calculated.

In addition, since the elution temperature increases with the increase of the crystallinity of the eluted component, the crystal distribution of the olefin-based copolymer may be found by obtaining the relation of the elution temperature and the elution amount (wt %) of the olefin-based copolymer.

The olefin-based copolymer of the present invention may have a soluble fraction at −20° C. measured by CFC of 0.5 to 20 wt %, preferably, 0.5 to 15 wt %, or 0.5 to 10 wt %. Particularly, the soluble fraction at −20° C. measured by CFC may be 0.5 wt % or more, or 1 wt % or more, 2 wt % or more, and 10 wt % or less, 8 wt % or less, less than 8 wt %, 7 wt % or less, or 6 wt % or less.

In addition, while satisfying the soluble fraction content at −20° C., the weight average molecular weight of the soluble fraction (Mw(SF)) may be 22,000 or more, preferably, 23,000 or more, more preferably, 25,000 or more. In addition, the weight average molecular weight of the soluble fraction (Mw(SF)) may be 60,000 or less, less than 60,000, 50,000 or less, less than 50,000, 45,000 or less, 43,000 or less, or 40,000 or less.

It is known that the olefin-based copolymer eluted at a low elution temperature is a low-crystalline copolymer having low stereoregularity, high comonomer content and low density. Particularly, as measured in the present invention, the soluble fraction at −20° C. includes components having extremely very low crystallinity and has strong amorphous properties, and is expressed as an ultralow crystalline region. In general polymerization, if copolymerization properties are extremely increased, the molecular weight of a polymer decreases in inverse proportion. As a result, the ultralow crystalline soluble fraction which is eluted at −20° C. or less generally has a very low molecular weight when compared with the whole olefin-based copolymer.

Meanwhile, the soluble fraction of −20° C. has ultralow crystallinity, and has a very low density and excellent elasticity, and if prepared into a polypropylene-based composite material, effects of improving impact strength are achieved. On the contrary, considering the molecular weight, the molecular weight is markedly low in contrast to the molecular weight of the whole olefin-based copolymer, and the soluble fraction causes the decrease of mechanical strength such as tensile strength, and accordingly, there are problems of showing weak impact strength at low and high temperatures.

On the contrary, in the olefin-based copolymer of the present invention, the content of the soluble fraction at −20° C. measured by CFC as described above is 0.5 to 20 wt %, but various physical properties such as flexural strength and hardness as well as tearing strength and tensile strength are excellent. This is achieved because the weight average molecular weight of the soluble fraction shows a high value like 22,000 or more, preferably, 23,000 or more, more preferably, 25,000 or more.

According to conditions (c), the value of Mw:Mw(SF), which is a ratio of a weight average molecular weight of the olefin-based copolymer (Mw) and the weight average molecular weight of the soluble fraction (Mw(SF)), is 0.9:1 to 2:1.

As described above, the olefin-based copolymer of the present invention has a high absolute value of the weight average molecular weight of the soluble fraction at −20° C. measured by CFC of 20,000 or more, preferably, 22,000 or more, more preferably, 25,000 or more. In addition, the molecular weight distribution is considered uniformed irrespective of crystallinity when compared with the conventional copolymer such that the value of Mw:Mw(SF) satisfies 0.9:1 to 2:1. As described above, because the molecular weight in the ultralow crystalline region which is the soluble fraction at −20° C. maintains a similar level in contrast to the total molecular weight, mechanical properties such as tensile strength are excellent while having the similar level of impact strength with respect to the conventional olefin-based copolymer.

The value of Mw:Mw(SF) may be 0.9:1 to 2:1, preferably, 1:1 to 2:1, and if the ratio of Mw(SF) with respect to Mw increases, the impact strength of the olefin-based copolymer at low and high temperatures may also be improved.

In addition, the olefin-based copolymer of the present invention shows a low density of 0.85 g/cc to 0.89 g/cc, particularly, 0.855 to 0.89 g/cc, more particularly, 0.86 to 0.89 g/cc, if measured according to ASTM D-792. That is, the olefin-based copolymer according to the present invention may be an olefin-based copolymer with a low density, which satisfies the conditions of (a) to (c) as described above and has a low density in the above-described range at the same time, but the density value is not limited thereto.

In addition, the olefin-based copolymer of the present invention may further satisfy a weight average molecular weight (Mw) of 10,000 to 100,000 g/mol, particularly, 20,000 to 80,000 g/mol, more particularly, 20,000 to 70,000 g/mol, or 30,000 to 70,000 g/mol. The weight average molecular weight (Mw) is a polystyrene conversion molecular weight analyzed by gel permeation chromatography (GPC).

In addition, the olefin-based copolymer of the present invention may have a ratio (Mw/Mn) of a weight average molecular weight (Mw) and a number average molecular weight (Mn), i.e., molecular weight distribution (MWD) of 1.5 to 3.0, particularly, 1.5 to 2.8, more particularly, 1.9 to 2.5.

The olefin-based copolymer of the present invention may have hardness (shore A) of 30 to 80, particularly, 40 to 80, more particularly, 50 to 80. The olefin-based copolymer may show higher hardness (shore A) with the equivalent degrees of density and melt index values when compared with a commonly used conventional olefin-based copolymer, and accordingly, may have improved tearing strength, tensile strength, elongation rate and flexural strength.

As described later, the olefin-based copolymer of the present invention may be an olefin-based copolymer prepared by carrying out polymerization reaction using a transition metal compound represented by Formula 1 as a catalyst and injecting a specific amount of hydrogen, and by preparing by such a preparation method, the olefin-based copolymer of the present invention shows higher weight average molecular weight value of a soluble fraction at −20° C. and improved physical properties of tearing strength, tensile strength, elongation rate and flexural strength when compared with the conventional olefin-based copolymer.

The olefin-based copolymer of the present invention may be a copolymer of two or more selected from olefin-based monomers, particularly, an alpha-olefin-based monomer, a cyclic olefin-based monomer, a diene olefin-based monomer, a triene olefin-based monomer and a styrene-based monomer, and particularly, a copolymer of ethylene and an alpha-olefin-based monomer of 3 to 12 carbon atoms, or a copolymer of ethylene and an alpha-olefin-based monomer of 3 to 10 carbon atoms. Particularly, the olefin-based copolymer of the present invention may be a copolymer of ethylene with propylene, ethylene with 1-butene, ethylene with 1-hexene, ethylene with 4-methyl-1-pentene or ethylene with 1-octene.

The alpha-olefin monomer may include one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicocene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene and 3-chloromethylstyrene, without limitation.

The olefin-based copolymer of the present invention may be prepared by continuous solution polymerization reaction by which an olefin-based monomer is polymerized while continuously injecting hydrogen in the presence of a metallocene catalyst composition including one or more transition metal compounds in a single reactor.

The olefin-based copolymer according to the present invention may be selected from the group consisting of a random copolymer, an alternating copolymer and a graft copolymer, and more particularly, may be a random copolymer.

Method for Preparing Olefin-Based Copolymer

The method for preparing the olefin-based copolymer of the present invention is characterized in including a step of polymerizing an olefin-based monomer by injecting hydrogen in 10 to 100 cc/min in the presence of a catalyst composition including a transition metal compound represented by the following Formula 1:

[Formula 1]

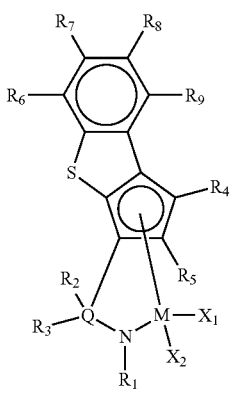

In Formula 1, $R_1$ is hydrogen; alkyl of 1 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_2$ and $R_3$ are each independently hydrogen; halogen; alkyl of 1 to 20 carbon atoms; alkenyl of 2 to 20 carbon atoms; arylalkyl of 7 to 20 carbon atoms; alkylamido of 1 to 20 carbon atoms; or arylamido of 6 to 20 carbon atoms, $R_4$ to $R_9$ are each independently hydrogen; silyl; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms, two or more adjacent groups among $R_2$ to $R_9$ may be connected with each other to form a ring, Q is Si, C, N, P or S, M is a transition metal in group 4, and $X_1$ and $X_2$ are each independently hydrogen; halogen; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

In the transition metal compound of Formula 1, described in the present disclosure, cyclopentadiene to which benzothiophene is fused by ring-type bonding, and an amido group ($N-R_1$) are stably crosslinked by Q (Si, C, N or P), and a structure where a transition metal in group 4 makes coordination bonds is formed.

If the catalyst composition is applied to the polymerization reaction of the olefin-based monomer, the production of a copolymer having high activity, high molecular weight and high copolymerization properties at a high polymerization temperature may be achieved.

Particularly, the transition metal compound of Formula 1 may introduce a large amount of alpha-olefin as well as linear low-density polyethylene with a level of 0.85 g/cc to 0.93 g/cc due to its structural characteristics, and the preparation of a polymer (elastomer) in a ultralow density region of a density of less than 0.910 g/cc is possible.

In addition, in the present invention, the olefin-based copolymer is prepared by polymerizing an olefin-based monomer by using the catalyst of the transition metal compound represented by Formula 1 and injecting hydrogen in 10 to 100 cc/min, and an olefin-based copolymer having a high weight average molecular weight of a soluble fraction at a low temperature and showing excellent physical properties including tearing strength, tensile strength and elongation rate may be prepared as described above when compared with an olefin-based copolymer prepared by polymerizing a monomer using a transition metal compound not corresponding to Formula 1 or not injecting hydrogen.

In Formula 1, $R_1$ may be hydrogen; alkyl of 1 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms. Preferably, $R_1$ may be alkyl of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, and more preferably, may be methyl, ethyl, propyl, butyl, isobutyl, tert-butyl, isopropyl, benzyl, phenyl, methoxyphenyl, ethoxyphenyl, fluorophenyl, bromophenyl, chlorophenyl, dimethylphenyl or diethylphenyl.

In Formula 1, $R_2$ and $R_3$ may be each independently hydrogen; alkyl of 1 to 20 carbon atoms; or alkylaryl of 7 to 20 carbon atoms, and preferably, $R_2$ and $R_3$ may be each independently hydrogen; or alkyl of 1 to 20 carbon atoms.

In Formula 1, $R_4$ to $R_9$ may be each independently hydrogen; alkyl of 1 to 20 carbon atoms; aryl of 6 to 20 carbon atoms; alkylaryl of 7 to 20 carbon atoms; or arylalkyl of 7 to 20 carbon atoms.

In Formula 1, $R_4$ and $R_5$ may be the same or different, and may be each independently alkyl of 1 to 20 carbon atoms; or aryl of 6 to 20 carbon atoms.

In Formula 1, $R_4$ and $R_5$ may be the same or different, and may be each independently alkyl of 1 to 6 carbon atoms.

In Formula 1, $R_4$ and $R_5$ may be methyl, ethyl or propyl.

In Formula 1, $R_6$ to $R_9$ may be the same or different and may be each independently hydrogen; alkyl of 1 to 20 carbon atoms; aryl of 6 to 20 carbon atoms; alkylaryl of 7 to 20 carbon atoms, or arylalkyl of 7 to 20 carbon atoms.

In Formula 1, $R_6$ to $R_9$ may be the same or different and may be each independently hydrogen; or alkyl of 1 to 20 carbon atoms.

In Formula 1, $R_6$ to $R_9$ may be the same or different and may be each independently hydrogen or methyl.

In Formula 1, M may be Ti, Hf or Zr.

In Formula 1, $X_1$ and $X_2$ may be the same or different and may be each independently hydrogen, halogen, alkyl of 1 to 20 carbon atoms, or alkenyl of 2 to 20 carbon atoms.

Preferably, $R_1$ may be hydrogen; alkyl of 1 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_2$ and $R_3$ may be each independently hydrogen; alkyl of 1 to 20 carbon atoms; or alkylaryl of 7 to 20 carbon atoms, $R_4$ to $R_9$ may be each independently hydrogen; alkyl of 1 to 20 carbon atoms; aryl of 6 to 20 carbon atoms; alkylaryl of 7 to 20 carbon atoms; or arylalkyl of 7 to 20 carbon atoms, where adjacent two or more among $R_2$ to $R_9$ may be connected with each other to form an aliphatic ring of 5 to 20 carbon atoms or an aromatic ring of 6 to 20 carbon atoms, and the aliphatic ring or aromatic ring may be substituted with halogen, alkyl of 1 to 20 carbon atoms, alkenyl of 2 to 20 carbon atoms, or aryl of 6 to 20 carbon atoms, and Q may be Si, C, N or P.

More preferably, $R_1$ may be alkyl of 1 to 20 carbon atoms; aryl of 6 to 20 carbon atoms; arylalkoxy of 7 to 20 carbon atoms; or arylalkyl of 7 to 20 carbon atoms, $R_2$ and $R_3$ may be each independently hydrogen; or alkyl of 1 to 20 carbon atoms, $R_4$ to $R_9$ may be each independently hydrogen; alkyl of 1 to 20 carbon atoms; or aryl of 6 to 20 carbon atoms, and Q may be Si.

In addition, the transition metal compound represented by Formula 1 may be selected from the group consisting of the following Formula 1-1 to Formula 1-6, but an embodiment is not limited thereto and various compounds within the defined range by Formula 1 may be applied in the present invention:

[Formula 1-1]

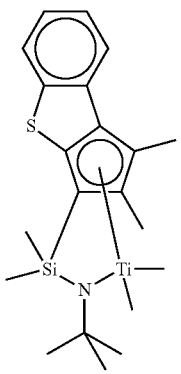

[Formula 1-2]

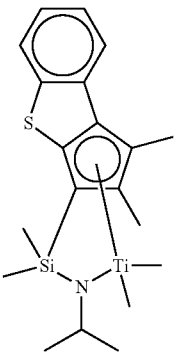

[Formula 1-3]

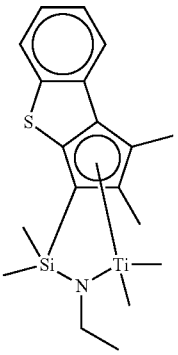

[Formula 1-4]

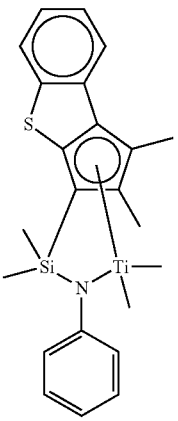

[Formula 1-5]

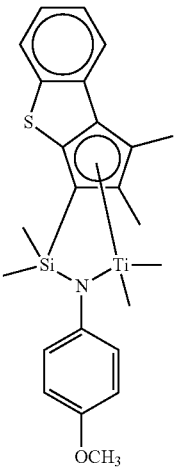

[Formula 1-6]

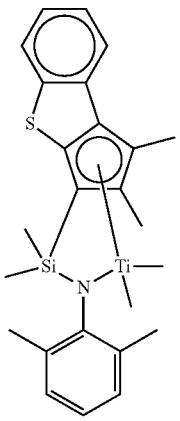

Each substituent used in this disclosure will be explained in detail as follows.

The term "halogen" used in the present invention means fluorine, chlorine, bromine or iodine.

In the present invention, the term "alkyl" means a linear chain or branch chain of an alkylene residual group.

In the present invention, the term "alkenyl" means a linear chain or branch chain of an alkenyl group. The branched chain may be alkyl of 1 to 20 carbon atoms; alkenyl of 2 to 20 carbon atoms; aryl of 6 to 20 carbon atoms; alkylaryl of 7 to 20 carbon atoms; or arylalkyl of 7 to 20 carbon atoms.

In the present invention, the term "aryl" may preferably have 6 to 20 carbon atoms, and may particularly be phenyl, naphthyl, anthracenyl, etc., without limitation.

In the present invention, the term "silyl" may be silyl substituted with alkyl of 1 to 20 carbon atoms, and may be, for example, trimethylsilyl or triethylsilyl.

In the present invention, the term "alkylaryl" means an aryl group substituted with the alkyl group.

In the present invention, the term "arylalkyl" means an alkyl group substituted with the aryl group.

In the present invention, the term "alkyl amino" means an amino group substituted with the alkyl group, and includes a dimethylamino group, a diethylamino group, etc., without limitation.

In the present invention, the term "hydrocarbyl group" means a monofunctional hydrocarbon group of 1 to 20 carbon atoms, which is composed of only carbon and hydrogen irrespective of its structure, such as alkyl, aryl, alkenyl, alkynyl, cycloalkyl, alkylaryl and arylalkyl, unless otherwise referred to.

The transition metal compound represented by Formula 1 may be used solely, or as a composition type including one or more promoter compounds represented by Formula 2 to Formula 4 below in addition to the transition metal compound of Formula 1, as a catalyst of the polymerization reaction of an olefin-based monomer. The promoter compound may assist the activation of the transition metal compound of Formula 1 above.

—[Al($R_{10}$)—O]$_a$—     [Formula 2]

A($R_{10}$)$_3$     [Formula 3]

[L-H]$^+$[W(D)$_4$]$^-$ or [L]$^+$[W(D)$_4$]$^-$     [Formula 4]

In Formulae 2 to 4, $R_{10}$ groups may be the same or different from each other and each independently selected from the group consisting of halogen, hydrocarbyl of 1 to 20 carbon atoms, and halogen-substituted hydrocarbyl of 1 to 20 carbon atoms, A is aluminum or boron, D is each independently aryl of 6 to 20 carbon atoms or alkyl of 1 to 20 carbon atoms, of which one or more hydrogen atoms may be substituted with substituents, wherein the substituent is at least any one selected from the group consisting of halogen, hydrocarbyl of 1 to 20 carbon atoms, alkoxy of 1 to 20 carbon atoms and aryloxy of 6 to 20 carbon atoms, H is a hydrogen atom, L is a neutral or cationic Lewis acid, W is an element in group 13, and a is an integer of 2 or more.

The compound represented by Formula 2 may include alkylaluminoxane such as methylaluminoxane (MAO), ethylaluminoxane, isobutylaluminoxane and butylalminoxane, and a modified alkylaluminoxane obtained by mixing two or more kinds of the alkylaluminoxane, particularly, methylaluminoxane, modified methylaluminoxane (MMAO), without limitation.

The compound represented by Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc. and particularly, may be selected from trimethylaluminum, triethylaluminum and triisobutylaluminum, without limitation.

The compound represented by Formula 4 may include triethylammonium tetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliumtetraphenylboron, N,N-diethylaniliumtetrapentafluorophenylboron, diethylammoniumtetrapentafluorophenylboron, triphenylphosphoniumtetraphenylboron, trimethylphosphoniumtetraphenylboron, dimethylanilium tetrakis(pentafluorophenyl) borate, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl) aluminum, tributylammoniumtetra(p-trifluoromethylphenyl)aluminum, trimethylammoniumtetra (p-trifluoromethylphenyl)aluminum, tributylammoniumtetrapentafluorophenylaluminum, N,N-diethylaniliniumtetraphenylaluminum, N,N-diethylaniliumtetrapentafluorophenylaluminum, diethylammoniumtetrapentatetraphenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl) boron, triphenylcarboniumtetra(p-trifluoromethylphenyl) boron, or triphenylcarboniumtetrapentafluorophenylboron, without limitation.

The catalyst composition may be prepared by a method including a step of obtaining a mixture by contacting the transition metal compound represented by Formula 1 with the compound represented by Formula 2 or Formula 3; and a step of adding the compound represented by Formula 4 to the mixture, as the first method.

In this case, the molar ratio of the transition metal compound represented by Formula 1 and the compound represented by Formula 2 or Formula 3 may be 1:2 to 1:5,000, particularly, 1:10 to 1:1,000, more particularly, 1:2 to 1:500.

If the molar ratio of the transition metal compound represented by Formula 1 and the compound represented by Formula 2 or Formula 3 is less than 1:2, the amount of an alkylating agent is too small, and the alkylation of a metal compound may be incompletely carried out, and if the molar ratio is greater than 1:5,000, the alkylation of the metal compound may be achieved, but the activation of the alkylated metal compound may be incompletely carried out due to the side reactions between an excessive amount of the alkylating agent remained and an activating agent of the compound of Formula 4.

In addition, the molar ratio of the transition metal compound represented by Formula 1 and the compound represented by Formula 4 may be 1:1 to 1:25, particularly, 1:1 to 1:10, more particularly, 1:1 to 1:5. If the molar ratio of the transition metal compound represented by Formula 1 and the compound represented by Formula 4 is less than 1:1, the amount of an activating agent is relatively small, and the activation of the metal compound may be incompletely carried out, and thus, the activity of the catalyst composition may be deteriorated. If the molar ratio is greater than 1:25, the activation of the metal compound may be completely carried out, but due to the excessive amount of the activating agent remained, it would not be economical considering the unit cost of the catalyst composition, or the purity of a polymer produced may be degraded.

In addition, the catalyst composition may be prepared by a method of contacting the transition metal compound represented by Formula 1 with the compound represented by Formula 2, as the second method.

In this case, the molar ratio of the transition metal compound represented by Formula 1 and the compound represented by Formula 2 may be 1:10 to 1:10,000, particularly, 1:100 to 1:5,000, more particularly, 1:500 to 1:3,000. If the molar ratio is less than 1:10, the amount of an activating agent is relatively small, and the activation of a metal compound may be incompletely carried out and the activity of the catalyst composition thus produced may be degraded, and if the molar ratio is greater than 1:10,000, the activation of the metal compound may be completely carried out, but due to the excessive amount of the activating agent remained, it would not be economical considering the unit cost of the catalyst composition, or the purity of a polymer produced may be degraded.

As the reaction solvent during preparing the catalyst composition, a hydrocarbon-based solvent such as pentane, hexane, and heptane, or an aromatic solvent such as benzene and toluene may be used, without limitation.

In addition, the catalyst composition may include the transition metal compound and the promoter compound in a supported type on a support. Any supports used in a metallocene-based catalyst may be used as the support without specific limitation. Particularly, the support may be silica, silica-alumina or silica-magnesia, and any one among them or a mixture of two or more thereof may be used.

In case where the support is silica among them, since a silica support and the functional group of the metallocene compound of Formula 1 form a chemical bond, there is no catalyst separated from the surface during an olefin polymerization process. As a result, the generation of fouling, by which polymer particles are agglomerated on the wall side of a reactor or from each other during the preparation process of an olefin-based copolymer, may be prevented. In addition, the particle shape and apparent density of a polymer in the olefin-based copolymer prepared in the presence of a catalyst including the silica support are excellent.

More particularly, the support may be silica or silica-alumina, including a highly reactive siloxane group and dried at a high temperature through a method of drying at a high temperature, etc.

The support may further include an oxide, a carbonate, a sulfate, or a nitrate component such as such as $Na_2O$, $K_2CO_3$, $BaSO_4$ and $Mg(NO_3)_2$.

The drying temperature of the support is preferably, from 200 to 800° C., more preferably, from 300 to 600° C., most preferably, from 300 to 400° C. If the drying temperature of the support is less than 200° C., humidity is too high and water at the surface may react with the promoter, and if the temperature is greater than 800° C., the pores at the surface of the support may be combined to decrease the surface area, and a large amount of the hydroxyl groups at the surface may be removed to remain only siloxane groups to decrease reaction sites with the promoter, undesirably.

In addition, the amount of the hydroxyl group at the surface of the support may preferably be 0.1 to 10 mmol/g, and more preferably, 0.5 to 5 mmol/g. The amount of the hydroxyl group at the surface of the support may be controlled by the preparation method and conditions of the support, or drying conditions such as temperature, time, vacuum and spray drying.

The polymerization of the olefin-based copolymer may be performed at about 25 to about 500° C., particularly, 50 to 300° C., more preferably, 50 to 250° C., or 50 to 200° C.

In addition, the polymerization of the olefin-based copolymer may be performed at a pressure of 1 $kgf/cm^2$ to 150 $kgf/cm^2$, preferably, 1 $kgf/cm^2$ to 120 $kgf/cm^2$, more preferably, 5 $kgf/cm^2$ to 100 $kgf/cm^2$.

The polymerization reaction of the olefin monomer may be performed in an inert solvent, and as the inert solvent, benzene, toluene, xylene, cumene, heptane, cyclohexane, methylcyclohexane, methylcyclopentane, n-hexane, 1-hexene, and 1-octene may be used, without limitation.

The olefin-based copolymer may be usefully used for manufacturing a molded article. The molded article may particularly include a blow molding molded article, an inflation molded article, a cast molded article, an extrusion laminate molded article, an extrusion molded article, a foam molded article, an injection molded article, a sheet, a film, a fiber, a monofilament, or a non-woven fabric, without limitation.

EXAMPLES

Hereinafter, the present invention will be explained in more detail referring to embodiments. However, the embodiments are provided only for illustration, and the scope of the present invention is not limited thereto.

Preparation Example 1

<Preparation of Ligand Compound>

Synthesis of N-tert-butyl-1-(1,2-dimethyl-3H-benzo[b]cyclopenta[d]thiophene-3-yl)-1,1-dimethylsilaneamine

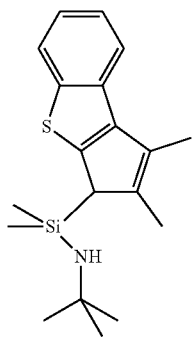

To a 100 ml schlenk flask, 4.65 g (15.88 mmol) of chloro-1-(1,2-dimethyl-3H-benzo[b]cyclopenta[d]thiophene-3-yl)-1,1-dimethylsilane was weighed and added, and 80 ml of THF was put thereto. At room temperature, tBuNH$_2$ (4 eq, 6.68 ml) was put thereto, followed by reacting at room temperature for 3 days. After finishing the reaction, THF was removed and the resultant reaction product was filtered with hexane. After drying solvents, 4.50 g (86%) of a yellow liquid was obtained.

$^1$H-NMR (in CDCl$_3$, 500 MHz): 7.99 (d, 1H), 7.83 (d, 1H), 7.35 (dd, 1H), 7.24 (dd, 1H), 3.49 (s, 1H), 2.37 (s, 3H), 2.17 (s, 3H), 1.27 (s, 9H), 0.19 (s, 3H), −0.17 (s, 3H).

<Preparation of Transition Metal Compound>

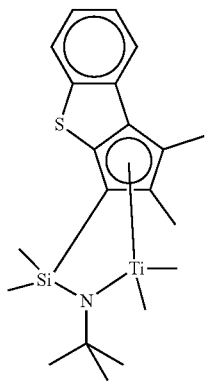

To a 50 ml schlenk flask, a ligand compound of N-tert-butyl-1-(1,2-dimethyl-3H-benzo[b]cyclopenta[d]thiophene-3-yl)-1,1-dimethylsilaneamine (1.06 g, 3.22 mmol/1 eq) and MTBE 16.0 ml (0.2 M) were put and stirred first. n-BuLi (2.64 ml, 6.60 mmol/2.05 eq, 2.5 M in THF) was added thereto at −40° C., followed by reacting at room temperature overnight. After that, MeMgBr (2.68 ml, 8.05 mmol/2.5 eq, 3.0 M in diethyl ether) was slowly added thereto dropwisely at −40° C., and TiCl$_4$ (2.68 ml, 3.22 mmol/1.0 eq, 1.0 M in toluene) was put in order, followed by reacting at room temperature overnight. After that, the reaction mixture was passed through celite for filtration using hexane. After dying the solvents, 1.07 g (82%) of a brown solid was obtained.

$^1$H-NMR (in CDCl$_3$, 500 MHz): 7.99 (d, 1H), 7.68 (d, 1H), 7.40 (dd, 1H), 7.30 (dd, 1H), 3.22 (s, 1H), 2.67 (s, 3H), 2.05 (s, 3H), 1.54 (s, 9H), 0.58 (s, 3H), 0.57 (s, 3H), 0.40 (s, 3H), −0.45 (s, 3H).

Comparative Preparation Example 1

<Preparation of Ligand Compound>

Synthesis of N-tert-butyl-1-(1,2-dimethyl-3H-benzo[b]cyclopenta[d]thiophene-3-yl)-1,1-(methyl)(phenyl)silaneamine

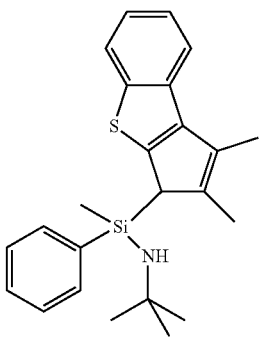 [SMILES: CC1=C(C)C([Si](C)(NC(C)(C)C)c2ccccc2)c2sc3ccccc3c21]

(i) Preparation of chloro-1-(1,2-dimethyl-3H-benzo[b]cyclopenta[d]thiophene-3-yl)-1,1-(methyl)(phenyl)silane To a 250 ml schlenk flask, 10 g (1.0 eq, 49.925 mmol) of 1,2-dimethyl-3H-benzo[b]cyclopenta[d]thiophene and 100 ml of THF were put, and 22 ml (1.1 eq, 54.918 mmol, 2.5 M in hexane) of n-BuLi was added thereto dropwisely at −30° C., followed by stirring at room temperature for 3 hours. A stirred Li-complex THF solution was cannulated into a schlenk flask containing 8.1 ml (1.0 eq, 49.925 mmol) of dichloro(methyl)(phenyl)silane and 70 ml of THF at −78° C., followed by stirring at room temperature overnight. After stirring, drying in vacuum was carried out and extraction with 100 ml of hexane was carried out.

(ii) Preparation of N-tert-butyl-1-(1,2-dimethyl-3H-benzo[b]cyclopenta[d]thiophene-3-yl)-1,1-(methyl)(phenyl)silaneamine To 100 ml of an extracted chloro-1-(1,2-dimethyl-3H-benzo[b]cyclopenta[d]thiophene-3-yl)-1,1-(methyl)(phenyl)silane hexane solution, 42 ml (8 eq, 399.4 mmol) of t-BuNH$_2$ was put at room temperature, followed by stirring at room temperature overnight. After stirring, drying in vacuum was carried out and extraction with 150 ml of hexane was carried out. After drying the solvents, 13.36 g (68%, dr=1:1) of a yellow solid was obtained.

$^1$H NMR (CDCl$_3$, 500 MHz): δ 7.93 (t, 2H), 7.79 (d, 1H), 7.71 (d, 1H), 7.60 (d, 2H), 7.48 (d, 2H), 7.40-7.10 (m, 10H, aromatic), 3.62 (s, 1H), 3.60 (s, 1H), 2.28 (s, 6H), 2.09 (s, 3H), 1.76 (s, 3H), 1.12 (s, 18H), 0.23 (s, 3H), 0.13 (s, 3H).

<Preparation of Transition Metal Compound>

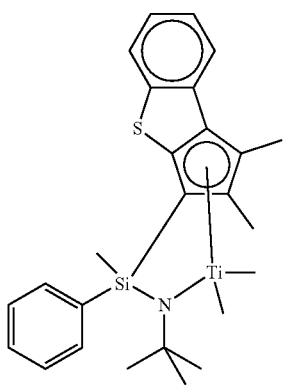

To a 100 ml schlenk flask, 4.93 g (12.575 mmol, 1.0 eq) of a ligand compound of N-tert-butyl-1-(1,2-dimethyl-3H-benzo[b]cyclopenta[d]thiophene-3-yl)-1,1-(methyl) (phenyl)silaneamine and 50 ml (0.2 M) of toluene were put and 10.3 ml (25.779 mmol, 2.05 eq, 2.5M in hexane) of n-BuLi was added thereto dropwisely at −30° C., followed by stirring at room temperature overnight. After stirring, 12.6 ml (37.725 mmol, 3.0 eq, 3.0 M in diethyl ether) of MeMgBr was added thereto dropwisely, 13.2 ml (13.204 mmol, 1.05 eq, 1.0 M in toluene) of TiCl$_4$ was put in order, followed by stirring at room temperature overnight. After stirring, drying in vacuum and extraction with 150 ml of hexane were carried out, the solvent was removed to 50 ml, and 4 ml (37.725 mmol, 3.0 eq) of DME was added dropwisely, followed by stirring at room temperature overnight. Again, drying in vacuum and extraction with 150 ml of hexane were carried out. After dying the solvents, 2.23 g (38%, dr=1:0.5) of a brown solid was obtained.

$^1$H NMR (CDCl$_3$, 500 MHz): δ 7.98 (d, 1H), 7.94 (d, 1H), 7.71 (t, 6H), 7.50-7.30 (10H), 2.66 (s, 3H), 2.61 (s, 3H), 2.15 (s, 3H), 1.62 (s, 9H), 1.56 (s, 9H), 1.53 (s, 3H), 0.93 (s, 3H), 0.31 (s, 3H), 0.58 (s, 3H), 0.51 (s, 3H), −0.26 (s, 3H), −0.39 (s, 3H).

Example 1

Into a 1.5 L autoclave continuous process reactor, a hexane solvent (7 kg/h) and 1-butene (0.95 kg/h) were charged, and the top of the reactor was pre-heated to a temperature of 141° C. A triisobutylaluminum compound (0.05 mmol/min), the transition metal compound (0.17 μmol/min) obtained in Preparation Example 1 as a catalyst, and a dimethylanilium tetrakis(pentafluorophenyl) borate promoter (0.51 μmol/min) were put into the reactor at the same time. Then, into the autoclave reactor, ethylene (0.87 kg/h) and a hydrogen gas (12 cc/min) were injected and a copolymerization reaction was continuously carried out while maintaining a pressure of 89 bar and 141° C. for 30 minutes or more to prepare a copolymer. After drying for 12 hours or more, the physical properties were measured.

Examples 2 to 5

Copolymers were prepared by carrying out the same method as in Example 1 except for changing reaction conditions as shown in Table 1 below.

Comparative Examples 1 and 2

DF7350 (Mitsui Co.) was purchased and used as Comparative Example 1, and EG8137 (Dow Chem) was purchased and used as Comparative Example 2.

Comparative Examples 3 and 4

Copolymers were prepared by carrying out the same method as in Example 1 except for using the catalyst of Preparation Example 1, not injecting a hydrogen gas, and changing the amounts of other materials as shown in Table 1 below for Comparative Example 3, and using the catalyst of Comparative Preparation Example 1, and changing the amounts of other materials as shown in Table 1 below for Comparative Example 4.

Comparative Example 5

EG8842 (Dow Co.) was purchased and used as Comparative Example 5.

TABLE 1

| | Catalyst | | | | | | | Alpha olefin monomer | | Reaction |
| --- | --- | --- | --- | --- | --- | --- | --- | --- | --- | --- |
| | Catalyst kind | content (μmol/min) | Promoter (μmol/min) | TiBAl (mmol/min) | Ethylene (kg/h) | Hydrogen (cc/min) | Hexane (kg/h) | 1-butene (kg/h) | 1-octene (kg/h) | temperature (° C.) |
| Example 1 | Preparation Example 1 | 0.17 | 0.51 | 0.05 | 0.87 | 12 | 7 | 0.95 | — | 141 |
| Example 2 | Preparation Example 1 | 0.17 | 0.51 | 0.05 | 0.87 | 9 | 7 | 0.91 | — | 141.9 |
| Example 3 | Preparation Example 1 | 0.17 | 0.51 | 0.05 | 0.87 | 12 | 7 | 0.95 | — | 141.1 |
| Example 4 | Preparation Example 1 | 0.48 | 1.44 | 0.1 | 0.87 | 8 | 7 | — | 1.87 | 140 |
| Example 5 | Preparation Example 1 | 0.48 | 1.44 | 0.1 | 0.87 | 8 | 7 | — | 1.87 | 140.2 |
| Comparative Example 1 | | | | | DF7350 | | | | | |
| Comparative Example 2 | | | | | EG8137 | | | | | |

TABLE 1-continued

| | Catalyst kind | Catalyst content (μmol/min) | Promoter (μmol/min) | TiBAl (mmol/min) | Ethylene (kg/h) | Hydrogen (cc/min) | Hexane (kg/h) | Alpha olefin monomer 1-butene (kg/h) | Alpha olefin monomer 1-octene (kg/h) | Reaction temperature (° C.) |
|---|---|---|---|---|---|---|---|---|---|---|
| Comparative Example 3 | Preparation Example 1 | 0.38 | 1.14 | 0.05 | 0.87 | — | 5 | 1 | — | 150 |
| Comparative Example 4 | Comparative Preparation Example 1 | 0.235 | 0.705 | 0.05 | 0.87 | 23 | 7 | 0.85 | — | 141 |
| Comparative Example 5 | | | | | EG8842 | | | | | |

Experimental Example 1

With respect to the copolymers of Examples 1 to 5, and Comparative Examples 1 to 5, physical properties were evaluated according to the methods below and are shown in Table 2 below.

1) Density of Polymer

Measurement was conducted according to ASTM D-792.

2) Melt Index (MI) of Polymer

Measurement was conducted according to ASTM D-1238 (condition E, 190° C., 2.16 kg load).

3) Weight Average Molecular Weight (g/Mol) and Molecular Weight Distribution (MWD)

Number average molecular weight (Mn) and weight average molecular weight (Mw) were measured respectively, using gel permeation chromatography (GPC), and molecular weight distribution was calculated through dividing the weight average molecular weight by the number average molecular weight. The weight average molecular weight (Mw) thus measured and molecular weight distribution (MWD) show values for the total fraction of the polymer prepared.

column: PL Olexis
    solvent: trichlorobenzene (TCB)
    flow rate: 1.0 ml/min
    specimen concentration: 1.0 mg/ml
    injection amount: 200 μl
    column temperature: 160° C.
    Detector: Agilent High Temperature RI detector
    Standard: Polystyrene (calibrated by cubic function)

4) Melting Temperature (Tm)

The melting temperature was obtained using a differential scanning calorimeter (DSC 6000) manufactured by PerKinElmer Co. That is, the temperature was elevated to 200° C., kept for 1 minute, and decreased to −100° C., and then, the temperature was elevated again. The apex of a DSC curve was set to the melting temperature. In this case, the elevating rate and decreasing rate of the temperature were controlled to 10° C./min, and the melting point was obtained during the second elevation of the temperature.

5) Elution Temperature (Te)

CFC of PolymerChar Co. was used as a measurement apparatus. First, the polymer was completely dissolved using o-dichlorobenzene as a solvent at 130° C. for 60 minutes in an oven in a CFC analyzer, and then the solution was introduced into a TREF column controlled to 130° C. Then, the column was cooled to 95°C and stabilized for 45 minutes. Then, the temperature of the TREF column was decreased to −20° C. in a rate of 0.5° C./min, and was kept at −20° C. for 10 minutes. After that, an elution amount (mass %) was measured using an infrared spectrophotometer. Then, the temperature of the TREF column was increased in a rate of 20° C./min to a preset temperature and at the reached temperature, the temperature was maintained for a preset time (that is, about 27 minutes), and this work was repeated until the temperature of the TREF reached 130° C., and the amount (mass %) of an eluted fraction in each temperature range was measured. In addition, a weight average molecular weight (Mw) was measured by the same measurement principle of GPC except for sending the eluted fraction at each temperature to a GPC column and using o-dichlorobenzene as a solvent.

The elution temperature (Te) means a temperature corresponding to the apex among peaks present after −20° C. on a graph of temperature vs. elution fraction.

6) Measurement of Soluble Fraction (SF) Content

The soluble fraction (SF) content means the amount of a fraction eluted at −20° C. or less, and the weight average molecular weight of the soluble fraction (Mw(SF)) was measured using a GPC column of CFC.

7) Weight Average Molecular Weight of Soluble Fraction (Mw(SF)) and Mw:Mw(SF)

Mw:Mw(SF) was calculated as a ratio of the weight average molecular weight (Mw) measured by GPC and the weight average molecular weight of a soluble fraction (Mw(SF)) measured by CFC.

TABLE 2

| | Density (g/cc) | MI (dg/min) | Mw | MWD | Tm (° C.) | Te (° C.) | SF (%) | Mw (SF) | Mw:Mw (SF) |
|---|---|---|---|---|---|---|---|---|---|
| Example 1 | 0.8698 | 29.9 | 44043 | 2.03 | 55.6 | 17.0 | 5.0 | 25092 | 1.8:1 |
| Example 2 | 0.8721 | 24.6 | 53456 | 2.05 | 57.8 | 20.3 | 4.1 | 36346 | 1.47:1 |
| Example 3 | 0.8709 | 35.5 | 41949 | 2.09 | 56.2 | 17.9 | 5.5 | 35789 | 1.17:1 |
| Example 4 | 0.8674 | 12.6 | 65269 | 2.14 | 57.4 | 19.9 | 2.9 | 34750 | 1.9:1 |
| Example 5 | 0.8651 | 18.0 | 57700 | 2.2 | 56.4 | 17.9 | 3.8 | 39761 | 1.45:1 |
| Comparative Example 1 | 0.8700 | 29.5 | 44489 | 1.91 | 53.9 | 18.2 | 4.4 | 9877 | 4.5:1 |

TABLE 2-continued

| | Density (g/cc) | MI (dg/min) | Mw | MWD | Tm (° C.) | Te (° C.) | SF (%) | Mw (SF) | Mw:Mw (SF) |
|---|---|---|---|---|---|---|---|---|---|
| Comparative Example 2 | 0.8700 | 30.3 | 47495 | 2.12 | 53.6 | 17.6 | 4.6 | 10481 | 4.5:1 |
| Comparative Example 3 | 0.8702 | 28.3 | 45016 | 1.96 | 55.9 | 17.3 | 4.8 | 5587 | 8.1:1 |
| Comparative Example 4 | 0.8690 | 12.5 | 63581 | 2.04 | 61.1 | 23.3 | 3.3 | 20800 | 3.1:1 |
| Comparative Example 5 | 0.8590 | 0.95 | 132023 | 2.02 | 43.1 | 7.7 | 5.3 | 135552 | 0.97:1 |

As shown in Table 2, in Examples 1 to 5, by which olefin-based copolymers were prepared by using the transition metal compound of Formula 1 and injecting hydrogen, the soluble fraction showed a high value of a molecular weight of 22,000 or more, and at the same time, a ratio with respect to the total weight average molecular weight of the olefin-based copolymer was included in 1:1 to 2:1 and the weight average molecular weight of the soluble fraction showed a similar level as the total weight average molecular weight.

In contrast, in Comparative Examples 1 and 2, corresponding to commercially available conventional copolymers, Comparative Example 3 by which polymerization was conducted without injecting hydrogen, and Comparative Example 4 using the catalyst of Comparative Preparation Example 1, which does not correspond to Formula 1, the weight average molecular weight of a soluble fraction was less than 22,000, and a ratio with respect to the weight average molecular weight of the total olefin-based copolymer was 3.1:1 to 8.1:1, showing a large difference.

Particularly, as in Comparative Example 5, it was confirmed that if the ratio of the weight average molecular weight of the soluble fraction with respect to the total weight average molecular weight was increased, the maintenance of the high melt index of 10 or more, at the same time, was difficult.

Experimental Example 2

With respect to the olefin-based copolymers of Examples 1 and 4, and Comparative Examples 1 to 4, tearing strength, tensile strength, elongation rate, flexural strength and hardness were measured according to the methods below, and the results are shown in Table 3 below.

1) Tearing Strength, Tensile Strength and Elongation Rate

Each of the olefin-based copolymers were extruded to form a pellet, and measurement was conducted based on ASTM D638 (50 mm/min).

2) Flexural Strength

Measurement was conducted according to ASTM D790.

3) Hardness (Shore A)

Measurement was conducted according to ASTM D2240 using GC610 STAND for Durometer of TECLOCK Co. and a Shore hardness tester Type A of Mitutoyo Co.

TABLE 3

| | Tearing strength (kN/m) | Tensile strength (MPa) | Elongation rate (%) | Flexural strength (MPa) | Hardness |
|---|---|---|---|---|---|
| Example 1 | 25.3 | 22.5 | >400 | 8.9 | 66.3 |
| Comparative Example 1 | 24.1 | 21.6 | >400 | 7.8 | 66.1 |

TABLE 3-continued

| | Tearing strength (kN/m) | Tensile strength (MPa) | Elongation rate (%) | Flexural strength (MPa) | Hardness |
|---|---|---|---|---|---|
| Comparative Example 2 | 23.8 | 22.6 | >400 | 8.0 | 64.7 |
| Comparative Example 3 | 23.0 | 20.2 | >400 | 6.9 | 64.2 |

TABLE 4

| | Tearing strength (kN/m) | Tensile strength (MPa) | Elongation rate (%) | Flexural strength (MPa) | Hardness |
|---|---|---|---|---|---|
| Example 4 | 32.64 | 4.47 | 1200 | 12.4 | 61.16 |
| Comparative Example 4 | 29.49 | 4.27 | 1200 | 12.2 | 58.5 |

As summarized in Table 2, the olefin-based copolymers of Example 1 and Comparative Examples 1 to 3 showed similar degree of melt index values. However, there is a difference as follows. Example 1 showed a Mw(SF) value of 22,000 or more and a Mw:Mw(SF) value of 1.8:1, and satisfied all conditions of (a) to (c), but Comparative Examples 1 to 3 showed a Mw(SF) value of less than 11,000 and a Mw:Mw(SF) value of 4.5:1 or 8:1, and did not satisfied the conditions of (b) and (c).

Similarly, the olefin-based copolymers of Example 4 and Comparative Example 4 showed melt index values of a similar degree. Here, there is a difference as follows. Example 4 showed a Mw(SF) value of 34,750 and a Mw:Mw(SF) value of 1.9:1, and satisfied all conditions of (a) to (c), but Comparative Example 4 showed a Mw(SF) value of less than 22,000 and a Mw:Mw(SF) value of 3.1:1, and did not satisfied the conditions of (b) and (c).

Based on the above-described contents, as shown in Table 3, the olefin-based copolymer of Example 1 showed the elongation rate of a similar degree and excellent physical properties including tearing strength, tensile strength, flexural strength, hardness, etc. when compared with the copolymers of Comparative Examples 1 to 3. Similarly, as shown in Table 4, the olefin-based copolymer of Example 4 showed improved physical properties including tearing strength, tensile strength, flexural strength, hardness, etc. than the olefin-based copolymer of Comparative Example 4.

That is, since the olefin-based copolymer of the present invention has a melt index of 10-100 g/10 min and satisfies the weight average molecular weight of a soluble fraction at −20° C. and the ratio to certain levels, and thus, satisfies all conditions of (a) to (c), and excellent physical properties such as tearing strength and tensile strength may be shown.

The invention claimed is:

1. An olefin-based copolymer satisfying the following conditions (a) to (c):
    (a) a melt index (MI, 190° C., 2.16 kg load conditions) is 10 to 100 g/10 min,
    (b) a soluble fraction (SF) at −20° ° C. measured by cross-fractionation chromatography (CFC) is 0.5 to 10 wt %, where a weight average molecular weight of the soluble fraction (Mw(SF)) is 22,000 or more, and
    (c) a value of Mw:Mw(SF), which is a ratio of a weight average molecular weight of the olefin-based copolymer (Mw) and the weight average molecular weight of the soluble fraction (Mw(SF)), is 0.9:1 to 2:1.

2. The olefin-based copolymer according to claim 1, wherein the weight average molecular weight of the olefin-based copolymer (Mw) is from 10,000 g/mol to 100,000 g/mol.

3. The olefin-based copolymer according to claim 1, wherein a molecular weight distribution of the olefin-based copolymer is from 1.5 to 3.0.

4. The olefin-based copolymer according to claim 1, wherein the olefin-based copolymer is a copolymer of ethylene and an alpha-olefin comonomer of 3 to 12 carbon atoms.

5. The olefin-based copolymer according to claim 4, wherein the alpha-olefin comonomer comprises one or more of propylene, 1-butene, 1-pentene, 4-methyl-1-pentene, 1-hexene, 1-heptene, 1-octene, 1-decene, 1-undecene, 1-dodecene, norbornene, norbornadiene, ethylidene norbornene, vinyl norbornene, dicyclopentadiene, 1,4-butadiene, 1,5-pentadiene, 1,6-hexadiene, styrene, alpha-methylstyrene, divinylbenzene or 3-chloromethylstyrene.

6. A method for preparing the olefin-based copolymer of claim 1, the method comprising:
    a step of polymerizing an olefin-based monomer by injecting hydrogen in 10 to 100 cc/min in the presence of a catalyst composition comprising a transition metal compound represented by Formula 1:

[Formula 1]

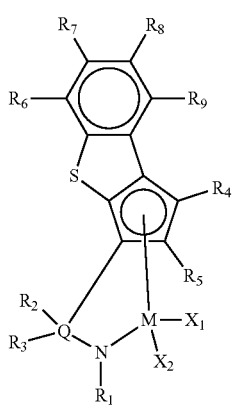

in Formula 1,
$R_1$ is methyl, ethyl, propyl, butyl, isobutyl, tert-butyl, or isopropyl,
$R_2$ and $R_3$ are each methyl,
$R_4$ and $R_5$ are each independently methyl, ethyl or propyl
$R_6$ to $R_9$ are each hydrogen,
Q is Si,
M is 4Ti, and
$X_1$ and $X_2$ are each methyl.

7. The method for preparing the olefin-based copolymer according to claim 6, wherein the transition metal compound represented by Formula 1 is selected from the group consisting of compounds of the following Formula 1-1 to Formula 1-3:

[Formula 1-1]

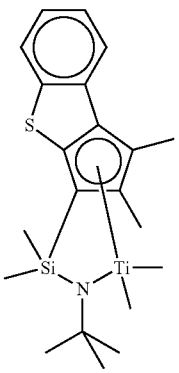

[Formula 1-2]

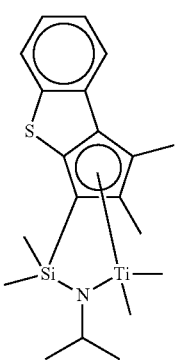

[Formula 1-3]

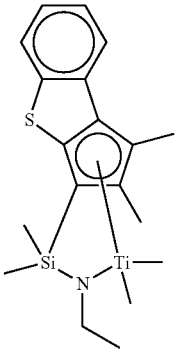

8. The method for preparing the olefin-based copolymer according to claim 6, wherein the polymerization is carried out at 50 to 200° C.

9. The olefin-based copolymer according to claim 1, wherein the weight average molecular weight of the soluble fraction (Mw(SF)) is 60,000 or less.

10. The olefin-based copolymer according to claim 1, wherein the olefin-based copolymer has a low density of 0.85 g/cc to 0.89 g/cc measured according to ASTM D-792.

* * * * *